July 18, 1961
C. A. DAVIS
2,992,655
TRANSFORMER VALVE
Filed Dec. 30, 1958
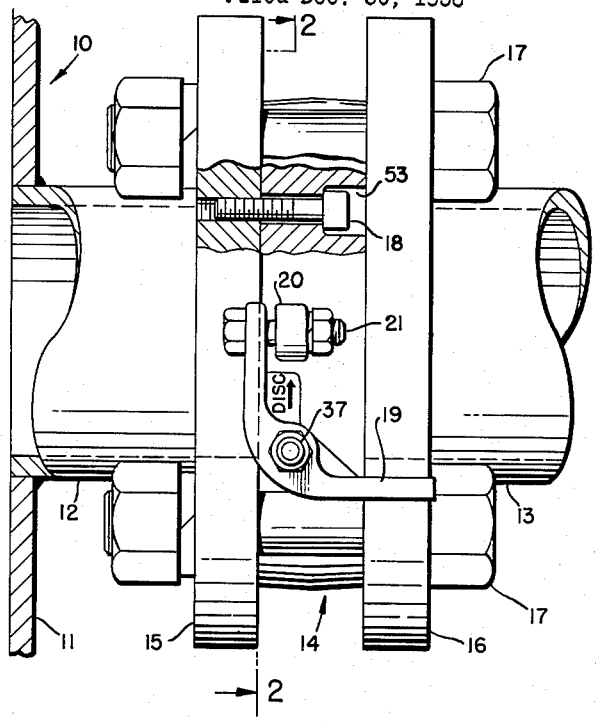
FIG. 1
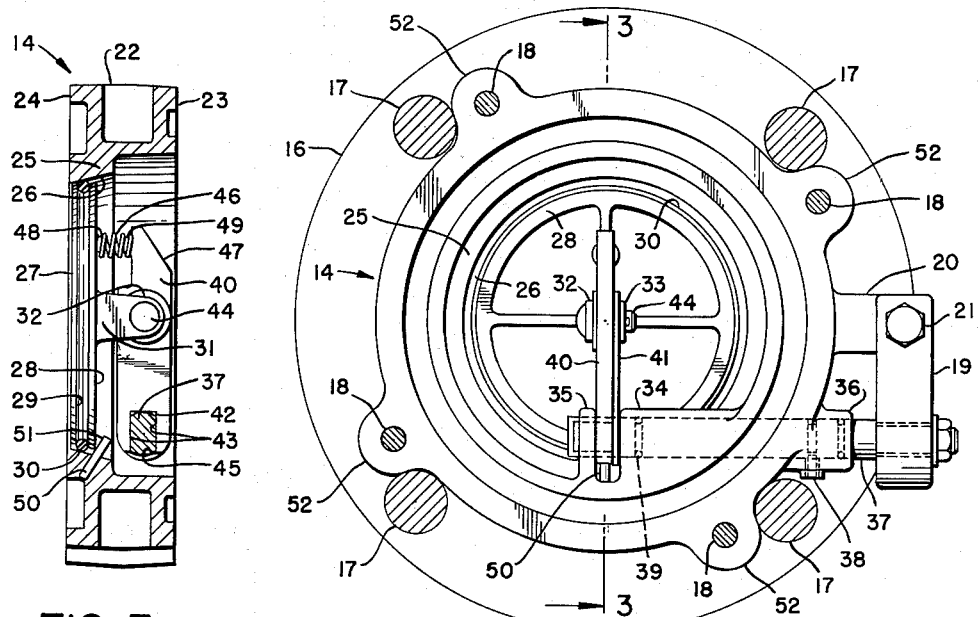
FIG. 3
FIG. 2
INVENTOR.
CHARLES A. DAVIS
BY
Kenneth W Miller
ATTORNEY

United States Patent Office 2,992,655
Patented July 18, 1961

2,992,655
TRANSFORMER VALVE
Charles A. Davis, Mansfield, Ohio, assignor to The Ohio Brass Company, Mansfield, Ohio, a corporation of New Jersey
Filed Dec. 30, 1958, Ser. No. 783,832
10 Claims. (Cl. 137—454.2)

This invention relates to electrical container apparatus and cooling systems and to valves useful therein.

A principal object of the invention is to improve and simplify electrical container apparatus for transformers, circuit breakers and the like.

Another principal object of the invention is to provide a new form of valve useful for general application.

According to certain practices in eelctrical apparatus manufacturing, special requirements are imposed upon the apparatus containers and related apparatus when the apparatus is provided with liquid coolants. Specifically, large cooling radiators must be provided to dissipate the heat generated during the operation of the apparatus and mounting apparatus of adequate strength must be provided in order to suitably carry the radiator on the apparatus. Moreover, when shipping the apparatus from the factory to its ultimate location, the radiators are removed and a valve is provided in order to retain the coolant in the transformer housing.

As is set forth in my application Serial Number 506,485, now United States Patent Number 2,872,153, the special requirements imposed upon valves suitable for such use present certain design problems. Specifically, the valve must have a relatively high flow capacity when in open position; the valve must be rugged and capable of withstanding considerable use and abuse without leaking and without physical damage to its operating parts or to its positioning relative to the transformer housing; and finally, because of the numbers and sizes of the valves required, the valve must be adapted to low cost production processes. Various forms of valves have heretofore been utilized which met certain of these requirements to a greater or lesser degree.

According to the present invention, I have devised an electrical container apparatus including a valve for controlling the coolant fluids which has substantiall advantages over any arrangements yet devised. Specifically, I provide an axially thin or wafer type valve in conjunction with the conduit apparatus for connection between the radiator and apparatus housing. By providing a valve which has a limited axial extent, the susceptibility of the valve to damage, either during movement of the apparatus or during ordinary operation and maintenance, is greatly reduced.

As described hereinafter, the valve constitutes a cast single piece body having an axial extent only sufficient to accommodate a tapered valve seat and valve disc, and a pivotal mounting for the valve disc together with an operating lever therefor. The valve is secured to the face of a flange which is carried by a conduit on the wall of the container housing while a matching flange carried on the conduit of the radiator header is separately secured to the first flange.

The valve, as such, is of a new and novel construction and is useful in any application where advantages would be achieved by the use of a valve having a limited axial extent or where it is required to detach or replace parts of fluid handling systems.

The features and advantages of the novel container apparatus and valve will be apparent from a consideration of the following detailed specification and claims taken in connection with the appended drawings, in which FIG. 1 is a side elevation view, partly broken away, of an electrical container apparatus embodying the invention;

FIG. 2 is an elevation view of the valve of the invention taken from the inlet side, in the direction 2—2 in FIG. 1; and FIG. 3 is a sectional view of the valve taken in the direction 3—3 in FIG. 2.

Referring now to FIG. 1, there is shown a transformer housing 10 having a side wall 11 with a conduit 12 for carrying a liquid coolant to and from the housing and an external device, such as a cooling radiator. A conduit 13 forms part of the header of the radiator. A valve 14 is received between two flanges 15 and 16 at the ends of the conduits 12 and 13, connected together by fasteners, such as the bolts 17, through suitable openings in the flanges. The valve 14 is separately secured to the flange 15 by means of a plurality of cap screws, of which the screw 18 is shown. Suitable gaskets are inserted between adjacent faces of the valve 14 and the flanges 15 and 16 to provide a fluid seal between the parts. The valve 14 is arranged with the inlet at the flange 15 and the outlet at the flange 16.

The transformer housing is filled with a liquid coolant, such as transformer oil, which ordinarily circulates from the radiator through the conduit 13, the valve 14 and the conduit 12 to the housing 10. The valve 14 has an operating handle 19 which is held in a valve-closed position during shipment of the transformer and in a valve-open position during normal operation of the transformer by means of a stud 20 and a bolt 21. The arrangement shown in FIG. 1 is useful for fluid handling apparatus generally.

Referring now to FIGS. 2 and 3, the valve 14 comprises a unitary, generally annular body 22 having an axial valve opening and plane parallel end faces 23 and 24 at the inlet and outlet ends thereof, respectively. A valve seat 25 adjacent the outlet of the valve is formed as an integral part of the body 22 and has the face 26 thereof tapered inwardly toward the longitudinal axis of the body in the direction of the outlet. A valve disc 27 comprises a circular metallic valve piece 28 having a groove 29 formed in the peripheral extremity thereof and an O-ring 30 received in the groove. The valve piece 28 has a stem 31 extending in the axial direction on the inlet side thereof with two spaced parts 32 and 33.

The body 22 has one portion of the side wall thereof adjacent the lower part of the valve formed with an internal boss 34, a second internal boss 35, spaced from the end of the boss 34, and an external boss 36. A shaft 37 is received in an opening which is machined through the bosses 34, 35 and 36, and the side wall of the body, on an axis perpendicular to a diametral plane through the body intermediate the ends of the bosses 34 and 35. The shaft is positioned in a lateral direction by means, including a set screw, shown in dotted outline at 38, which has the inner end thereof received in a groove in the shaft. The shaft opening is sealed by means such as an O-ring, indicated generally at 39. The handle 19 is suitably keyed to the shaft 37 and secured thereto.

The valve disc 27 is carried upon an operating lever 40 and a link 41 which, with the shaft 37 and handle 19, functions as an operating means for the valve. The operating lever 40 comprises an elongate rigid member which is connected to the shaft 37 for turning movement thereof. The lever 40 has an open rectangular slot 42 at the end thereof and the lever is carried on the shaft 37 between the bosses 34 and 35 with the end portions thereof in engagement with flat parallel faces 43 of the shaft.

The operating lever 40 is secured between the parts 32 and 33 of the valve stem 31 by a pin 44 which extends through the lever 40 and the link 41. The link 41 has an internal opening through which the shaft 37 extends and serves to hold the operating lever 40 in engagement with the shaft. The arrangement of the lever 40 and the link 41 between the bosses 34 and 35 serves as a lateral positioning means for the valve disc 27.

The valve is provided with means for positioning the valve disc 27 on the valve seat 25 when the valve is closed. To this end a spring 46 is carried between the valve piece 28 and an upper end part 47 of the operating lever 40. The spring is carried on two bosses 48 and 49 on the valve piece 28 and the end part 47, respectively, and functions to pivot the valve disc 27 about the pin 44 so that the lower portion of the valve disc is urged toward the lower ends of the operating lever 40 and link 41 and toward the shaft 37.

A guide pin 50 is carried by the valve body 22 at a position adjacent the shaft 37 and disposed generally in the plane of turning of the lever 40 and the valve disc 27. The forward or guide face 51 of the pin is disposed at an angle of about thirty degrees from the outlet end face 24 of the body. With this arrangement the inner edge of the valve piece 28 engages the face 51 of the pin 50 at about twenty degrees from the closed position. As the valve disc 27 is moved toward the valve seat, the lower edge of the valve piece 28 slides downward along the guide pin so that the closing force is applied at the pin, the stem and at the upper boss 48. With the mutual restraint of the parts in the lateral and vertical directions, the sealing engagement of the O-ring 30 with the seat face 26 about the entire circumference of the disc is insured.

The body 22 is formed with a plurality of radial mounting projections, designated at 52, which have the same thickness as the body so that the end faces of the projections are flush with the end faces 23 and 24 of the body. Each of the mounting projections 52 has an opening for receiving a mounting screw for the valve, for example the screw 18 shown in FIG. 1, and the flange 15 has a suitably tapped opening for receiving the screw. An enlarged recess 53 is formed in each of the projections 52 at the outlet end of the valve for receiving the head of the screw 18.

The opening in the conduit 12 and the flange 15 is large enough to receive the valve disc 27 when the valve disc is moved to its open position. In this position the valve disc is in a substantially horizontal position and presents a minimum obstruction to the flow of coolant between the transformer and the radiator.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. Electrical container apparatus including an apparatus housing having a side wall, fluid conduit means on the said wall and a flange therefor, an external device associated with the said apparatus housing including conduit means aligned with the said first-named conduit means and a flange therefor, the first-named conduit means including an opening for the passage of coolant between the interior of the said housing and the said external device, a valve having an annular body of limited axial extent carried between the two flanges with end faces on the valve in sealed engagement with end faces on the flanges and the inlet of the valve against the flange of the first-named conduit means and the outlet of the valve against the flange of the second-named conduit means, means fixedly attaching the said valve to the first-named flange for closing the first-named conduit means when the said valve is closed and means extending between the two flanges for connecting the two named conduit means and for compressively holding the flange of the second named conduit means against the valve.

2. The invention in accordance with claim 1 in which the said valve is provided with a valve disc and with an operating mechanism for the disc such that the disc is oriented edgewise to the direction of coolant flow when the valve is open and the axial extent of the valve body is substantially less than the axial extent of the disc in the open position so that the said disc is disposed at least partly in the first-named fluid conduit means.

3. The invention in accordance with claim 1 in which the said flanges are secured by bolt-type fasteners extending through the flanges exteriorly of the body and in which the last-named means comprises screw means extending through the body into the said flange and recessed into the body.

4. A valve comprising a rigid, generally annular body having a longitudinal axis and an axially directed through opening with an inlet at one end of the body and an outlet at the remaining end, a valve seat formed in the body at the outlet end thereof tapered axially inward in the direction of the said outlet end, a valve disc comprising a circular valve piece with a groove in the peripheral part thereof, a stem extending axially of the piece away from the valve seat, and an O-ring received in the groove for sealing engagement with the valve seat, a shaft arranged perpendicular to a diametral plane through the axis of the body in an opening transversely through a wall of the said body and fluid sealing means between the shaft and the wall, operating means for the disc comprising lever means connected to the shaft and pivotally connected to the said stem for moving the disc arcuately about the shaft from a closed position in engagement with the valve seat to an open position adjacent the body, means for urging the portion of the valve piece between the stem and the shaft toward the shaft and guide means carried by the body adjacent the shaft and having the side thereof toward the valve seat engaged by the inlet side of the valve piece for positioning the valve piece during closure of the valve for sealing engagement of the O-ring with the valve seat about the entire circumference of the valve disc.

5. A valve comprising a rigid, generally annular body having a longitudinal axis and an axially directed through opening with an inlet at one end of the body and an outlet at the remaining end, a valve seat formed in the body at the outlet end thereof tapered axially inward in the direction of the said outlet end, a valve disc comprising a circular valve piece with a groove in the peripheral part thereof, a stem extending axially of the piece away from the valve seat, and an O-ring received in the groove for sealing engagement with the valve seat, a shaft arranged perpendicular to a diametral plane through the axis of the body in an opening transversely through a wall of the said body and fluid sealing means between the shaft and the wall, operating means for the disc comprising lever means connected to the shaft and pivotally connected to the said stem for moving the disc arcuately about the shaft from a closed position in engagement with the valve seat to an open position adjacent the body, and means for positioning the said disc on the said seat during closure of the valve comprising a rigid extension of the said lever means beyond the said stem and a spring between the said extension and the said valve piece for urging the portion of the valve piece between the stem and the shaft toward the shaft, and guide means for the said valve disc comprising a member on the body having a face thereof inclined generally in a direction from the outlet side of the valve seat toward the inlet side of the valve seat for engagement by the valve piece in a position at least several degrees before the closed position.

6. The invention in accordance with claim 5 in which the wall of the said body is formed with a boss which extends inwardly to adjacent the center of the body and in which the shaft opening is formed, and with a second boss spaced from the end of the first-named boss, and with the lever means received between the said two bosses and between bifurcated portions of the said stem for laterally positioning the valve disc.

7. The invention in accordance with claim 5 in which the said lever means includes an elongated lever member with a rectangular slot in the shaft end thereof received over and in engagement with flat portions on the shaft, and a flat link arranged at one side of the lever member and in parallel therewith and having an internal opening through which the shaft extends for holding the lever member on the shaft.

8. A valve comprising a rigid generally tubular body having a longitudinal axis and an axially directed through opening with an inlet at one end of the body and an outlet at the remaining end, a valve seat formed in the body adjacent the outlet end thereof with the face of the seat tapered inwardly in the direction of the outlet, a valve disc having the peripheral extremity thereof conformed to the valve seat for closing the valve opening by engagement with the face of the seat, and a stem extending axially of the disc away from the valve seat with two transversely spaced parts at the extremity thereof, a shaft arranged perpendicular to a diametral plane through the longitudinal axis of the body in an opening transversely through a wall of the said body with means supporting the shaft including a first boss extending inwardly from the wall of the said body adjacent the transverse extremity of the body in the direction of the diametral plane, with a second boss spaced from the end of the said first boss and the shaft received through openings therein, and fluid sealing means between the shaft and the said first boss, link means received over the shaft between the bosses and fixed to the shaft for turning movement of the link means by the shaft and extending between the spaced parts of the stem, means pivotally attaching the said link means to the stem, means on the shaft exteriorly of the body for operatively actuating the shaft to move the disc into and out of engagement with the valve seat, and guide means for the valve disc comprising a member on the body adjacent the shaft and inclined generally in a direction from the valve seat toward the inlet for engagement by the valve piece during movement of the disc into engagement with the valve seat to insure valve closing engagement of the valve disc with the valve seat.

9. Fluid apparatus including first fluid conduit means and a flange at the end thereof, second fluid conduit means with a flange at the end thereof opposed to the flange of the said first conduit means, a valve having a generally annular body carried between the two flanges in fluid tight engagement with the end faces of the flanges, fastener means fixedly attaching the said valve to the flange of one of the said conduit means for closing the conduit means when the valve is closed, and detachable means extending between the two flanges for compressively holding the flange of the remaining one of the said conduit means against the valve and mechanically connecting the two conduit means, the said valve constituting a fluid flow control means for the two said conduit means when connected and for the said first conduit means when disconnected.

10. The invention in accordance with claim 9 in which the fastener means comprises screw means extending through the valve body into the said flange and recessed into the body, and in which the detachable means comprises bolt type fasteners extending through the flanges exteriorly of the body.

References Cited in the file of this patent

UNITED STATES PATENTS

| | | |
|---|---|---|
| 2,351 | Allen | Nov. 12, 1841 |
| 818,670 | Dumbolton | Apr. 24, 1906 |
| 1,121,199 | Pace | Dec. 15, 1914 |
| 1,672,603 | Dean | June 5, 1928 |
| 1,744,798 | Price | Jan. 28, 1930 |
| 2,740,423 | Stillwagon | Apr. 3, 1956 |
| 2,742,255 | Sealey | Apr. 17, 1956 |
| 2,756,017 | Silverman | July 24, 1956 |
| 2,805,837 | Kessler | Sept. 10, 1957 |

FOREIGN PATENTS

| | | |
|---|---|---|
| 909,786 | Germany | Apr. 26, 1954 |